United States Patent
Gandhi et al.

(10) Patent No.: US 9,561,698 B2
(45) Date of Patent: Feb. 7, 2017

(54) SHAPE MORPHING FUSELAGE FOR AN AEROCAR

(71) Applicant: Toyota Motor Engineering & Manufacturing North America, Inc., Erlanger, KY (US)

(72) Inventors: Umesh N. Gandhi, Farmington Hills, MI (US); Taewoo Nam, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 118 days.

(21) Appl. No.: 14/577,861

(22) Filed: Dec. 19, 2014

(65) Prior Publication Data

US 2016/0176256 A1 Jun. 23, 2016

(51) Int. Cl.
*B60F 5/02* (2006.01)
*B64C 3/56* (2006.01)
*B64C 1/06* (2006.01)

(52) U.S. Cl.
CPC . *B60F 5/02* (2013.01); *B64C 1/06* (2013.01); *B64C 3/56* (2013.01)

(58) Field of Classification Search
CPC ............ B60F 5/02; B64C 37/00; B64C 1/063; B64C 1/28; B64C 1/30; B64C 2001/0045; B64C 1/0009; B64C 1/068; B64C 1/12; B64C 3/56; B64C 1/06

See application file for complete search history.

(56) References Cited

U.S. PATENT DOCUMENTS

| | | | | |
|---|---|---|---|---|
| 2,353,820 A | * | 7/1944 | Eddins | B60P 9/00 135/149 |
| 2,811,323 A | * | 10/1957 | Rethorst | B64C 37/00 244/2 |
| 3,147,936 A | | 9/1964 | Mercille | |
| 4,165,846 A | * | 8/1979 | Groeger | B60B 3/048 244/2 |
| 4,579,297 A | * | 4/1986 | Ayoola | B60F 3/00 244/106 |
| 5,005,783 A | * | 4/1991 | Taylor | B64B 1/02 244/25 |

(Continued)

FOREIGN PATENT DOCUMENTS

| | | | |
|---|---|---|---|
| DE | 2058440 A1 | 5/1972 | |
| GB | 2303650 A * | 2/1997 | ............... E04B 1/19 |

(Continued)

*Primary Examiner* — Alexander V Giczy
(74) *Attorney, Agent, or Firm* — Christopher G. Darrow; Darrow Mustafa PC

(57) ABSTRACT

A shape morphing fuselage and method of transitioning an aerocar from a land mode to a flight mode are disclosed. The fuselage includes a plurality of flexible frame members and tensile skin extending between the plurality of flexible frame members as well as an actuation system configured to bend the plurality of flexible frame members between a contracted configuration associated with a flight mode and an expanded configuration associated with a land mode. The fuselage can also include a hatch pivotable about an axis of one of the flexible frame members in the expanded configuration and configured to open for deployment and retraction of wings for the aerocar.

16 Claims, 3 Drawing Sheets

(56) References Cited

U.S. PATENT DOCUMENTS

| | | | |
|---|---|---|---|
| 5,146,203 A * | 9/1992 | Simuni | B60C 23/0493 |
| | | | 123/537 |
| 5,356,094 A * | 10/1994 | Sylvain | B64C 3/56 |
| | | | 244/123.9 |
| 6,280,280 B1 | 8/2001 | Vicino et al. | |
| 6,619,584 B1 | 9/2003 | Haynes | |
| 7,854,467 B2 * | 12/2010 | McKnight | F15D 1/10 |
| | | | 296/180.1 |
| 2010/0230532 A1 * | 9/2010 | Dietrich | B64C 37/00 |
| | | | 244/49 |
| 2013/0126666 A1 * | 5/2013 | Brown | B60F 5/02 |
| | | | 244/2 |

FOREIGN PATENT DOCUMENTS

| | | | | |
|---|---|---|---|---|
| GB | WO 2014006422 A3 * | 2/2014 | | E01D 6/00 |
| SK | WO 2013032409 A1 * | 3/2013 | | B64C 3/385 |

* cited by examiner

SHAPE MORPHING FUSELAGE FOR AN AEROCAR

BACKGROUND

A roadable aircraft, or aerocar, is a vehicle that can be both driven on the road in a land mode and takeoff, fly, and land as an aircraft in a flight mode. Vehicles that demonstrate such capabilities provide operators with expanded private travel options. Such vehicles, however, can require physical tradeoffs in design in order to facilitate operations in both the land mode and the flight mode.

Typically, the body portion, or passenger compartment, of a land vehicle is shaped for passenger comfort and to facilitate maneuverability, whereas the fuselage of an aircraft is shaped to optimize aerodynamic lift, limit drag, and facilitate flight stability. Existing aerocars include wings used during the flight mode that are designed to fold against the fuselage in the land mode. Storing wings in such a manner can subject the wings to damage, reduce fuel economy, and limit operator aft and side views in the land mode.

SUMMARY

A shape morphing fuselage for an aerocar and a method for transitioning the fuselage from a land mode to a flight mode are disclosed. The fuselage can be constructed using a tensile skin stretched around and/or between flexible frame members. An expanded configuration for the flexible frame members and tensile skin can be associated with a land mode, allowing wings of the aerocar to be stored within an interior space or cavity of the fuselage when the aerocar travels on the road. A contracted configuration for the flexible frame members and tensile skin can be associated with a flight mode, allowing the shape morphing fuselage to be reduced in area in a tapering fashion in order to improve flight characteristics for the aerocar in the flight mode.

In one implementation, a fuselage for an aerocar is disclosed. The fuselage includes a plurality of flexible frame members and tensile skin extending between the plurality of flexible frame members. The plurality of flexible frame members and the tensile skin have a contracted configuration associated with a flight mode and an expanded configuration associated with a land mode.

In another implementation, another fuselage for an aerocar is disclosed. The fuselage includes a plurality of flexible frame members; an actuation system configured to bend the plurality of flexible frame members between a contracted configuration associated with a flight mode and an expanded configuration associated with a land mode; and a hatch pivotable about an axis of one of the flexible frame members in the expanded configuration and configured to open for deployment and retraction of wings for the aerocar.

In another implementation, a method of transitioning a fuselage from a land mode to a flight mode is disclosed. The method includes pivoting open a hatch in the fuselage about an axis of a flexible frame member in the land mode and deploying wings through the hatch. The method further includes pivoting closed the hatch while in the land mode and then bending, using an actuation system, the flexible frame member from an expanded configuration associated with the land mode to a contracted configuration associated with the flight mode.

BRIEF DESCRIPTION OF THE DRAWINGS

The description herein makes reference to the accompanying drawings wherein like reference numerals refer to like parts throughout the several views, and wherein.

DETAILED DESCRIPTION

An aerocar with a shape morphing fuselage that can transition between a land mode and a flight mode is described below. The shape morphing fuselage includes a plurality of flexible frame members and a tensile skin extending around and/or between the flexible frame members. An actuation system is configured to translate the flexible frame members between the land mode and the flight mode, the tensile skin contracting from a stretched state in the land mode to a contracted state in the flight mode.

In the land mode, the wings of the aerocar can be folded within an interior space or cavity of the shape morphing fuselage such that the wings are protected from damage during road driving. In the flight mode, the wings can be extended generally perpendicularly from the sides of the shape morphing fuselage through a hatch. Additionally, the cross-section of the shape morphing fuselage can be reduced in a tapering manner between the land mode and the flight mode to improve flight characteristics of the aerocar such as by improving lift and reducing drag.

Figure 1:
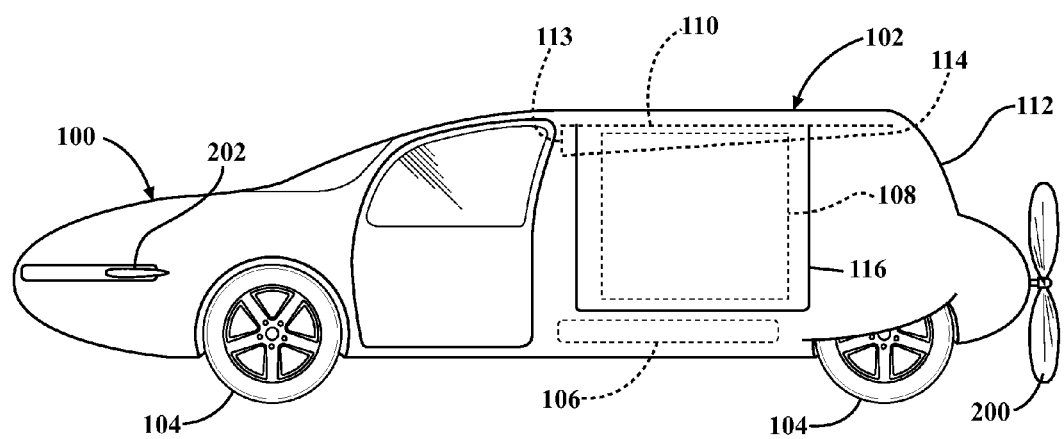
FIG. 1 is a side view of an aerocar with a shape morphing fuselage in a land mode.

FIG. 1 is a side view of an aerocar 100 with a shape morphing fuselage 102 in a land mode, that is, in a configuration suitable for driving the aerocar 100 on the road. The body of the aerocar 100 can be supported on wheels 104 driven by a power system. The power system can include a battery pack 106 as shown, and/or an internal combustion engine, gas turbine, fuel cell, or any other energy conversion device. In the land mode, the shape morphing fuselage 102 can define an interior space, or cavity, within the rear of the aerocar 100 of sufficient size to store a pair of wings 108. In FIG. 1, the wings 108 are shown in a folded configuration within the interior cavity of the shape morphing fuselage 102 as is consistent with operation of the aerocar 100 in the land mode. As the wings 108 do not extend outside of the shape morphing fuselage 102 when the aerocar 100 operates in the land mode, the wings 108 are protected from damage and the fuel economy of the aerocar 100 is improved in the land mode.

The shape morphing fuselage 102 can be constructed of a plurality of flexible frame members, such as flexible frame member 110. The flexible frame member 110 can have a cross section that tapers from a maximum at an end 113 of the flexible frame member 110 to a minimum at a tip 114 of the flexible frame member 110. The taper, or reduction, in cross-sectional area of the flexible frame member 110 along its length allows the flexible frame member 110 to be more easily bent at the tip 114 while retaining rigidity at the end 113. When the flexible frame member 110 is straight, the shape morphing fuselage 102 has a maximum amount of interior space, the interior space suitable for storing the wings 108 in a folded configuration.

The shape morphing fuselage 102 can also be constructed using a tensile skin 112 that extends between and/or around the plurality of flexible frame members. The tensile skin 112 is capable of being drawn out, or stretched, and can be constructed, for example, of an elastic or stretchy membrane material, such as silicone, or of a shape-memory material configured to expand and contract in order to mold smoothly to the plurality of flexible frame members when the flexible frame members are bent between the expanded configuration of the land mode and the contracted configuration of the flight mode.

The shape morphing fuselage 102 can also include a hatch 116 pivotable about an axis of the flexible frame member 110 when the flexible frame member 110 is positioned in the expanded configuration associated with the land mode. The hatch 116 can be configured to open for deployment and retraction of the wings 108 only when the shape morphing fuselage 102 is in the expanded configuration. The hatch 116 can alternatively be designed to slide, for example, along rails, that extend along the shape morphing fuselage 102 in order to facilitate deployment and retraction of the wings 108. (not shown) Other opening mechanisms for the hatch 116 are also possible.

Figure 2:
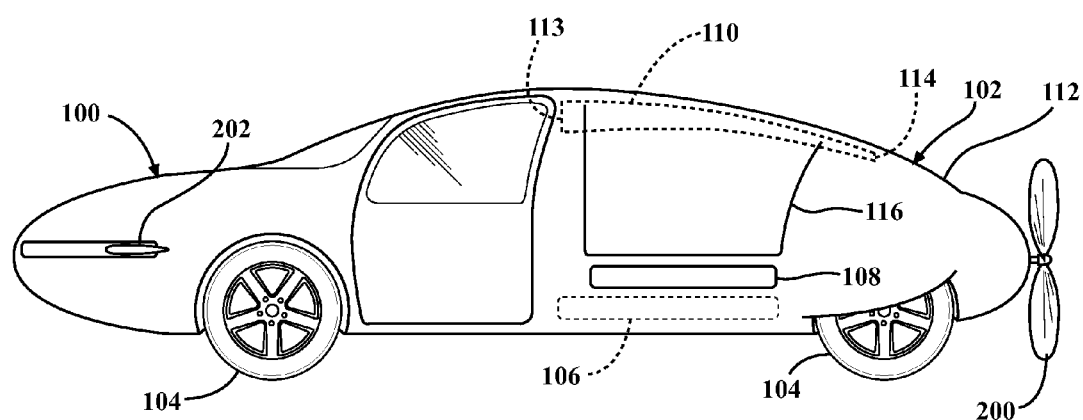
FIG. 2 is a side view of the aerocar of FIG. 1 with the shape morphing fuselage in a flight mode.

FIG. 2 is a side view of the aerocar 100 of FIG. 1 with the shape morphing fuselage 102 in a flight mode. In this example, the power system, such as the battery pack 106, also operates to power a propulsion system 200 in the flight mode. The propulsion system 200 can include, for example, a propeller as shown, an open rotor, a propeller rotor, a turbofan, or any other thrust generation system configured for flight-based propulsion. The aerocar 100 also includes a pair of canards 202 each located forward of the front wheels 104. Each canard 202 can include a moving surface configured to facilitate pitch and roll control of the aerocar 100 in the flight mode. The wings 108 and the canards 202 can extend generally perpendicularly from the shape morphing fuselage 102 in the flight mode to allow the aerocar 100 to generate sufficient lift and retain sufficient control for flight.

Figure 3:
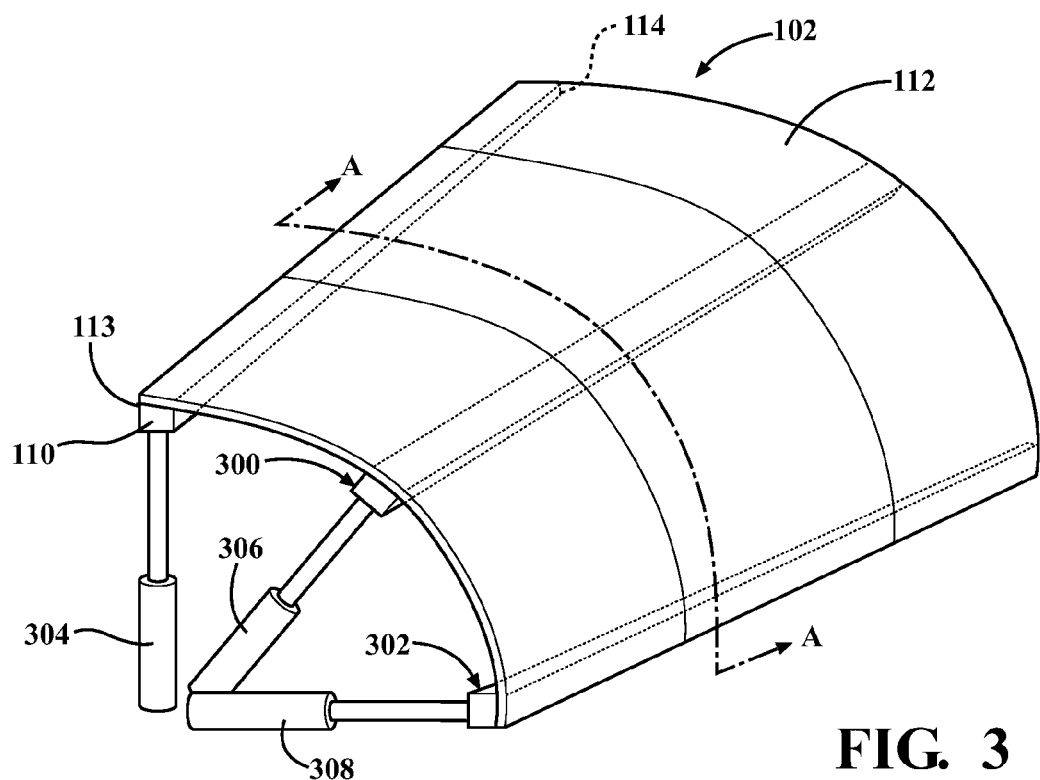
FIG. 3 is a perspective view of a portion of the shape morphing fuselage of the aerocar of FIGS. 1 and 2.

After the wings 108 have been deployed and the hatch 116 closed during the transition from land mode to flight mode, the plurality of flexible frame members, including flexible frame member 110, can be bent in order to taper the cross-sectional area of the shape morphing fuselage 102 along the body of the aerocar 100 into the contracted configuration. In turn, the tensile skin 112 can contract to narrow the body of the shape morphing fuselage 102 in order to improve the lift and drag characteristics of the aerocar 100 in preparation for flight. As described above, the tip 114 of the flexible frame member 110 has a smaller cross-section than the end 113, allowing for ease of bending. Mechanisms for altering the shape of the shape morphing fuselage 102 are described further below FIG. 3 is a perspective view of a portion of the shape morphing fuselage 102 of the aerocar 100 of FIGS. 1 and 2. The hatch 116 of FIGS. 1 and 2 is not shown here for clarity. The flexible frame member 110 of FIGS. 1 and 2 is shown at the top of the portion of the shape morphing fuselage 102 in addition to two additional flexible frame members 300, 302 present under the tensile skin 112 and spaced apart along the portion of the shape morphing fuselage 102 shown. Each of the flexible frame members 110, 300, 302 also includes a tapering cross section for ease of bending. For example, flexible frame member 110 has a smaller cross section at the tip 114 than at the end 113. This is also true for the flexible frame members 300, 302.

Each of the flexible frame members 110, 300, 302 can be bent using an actuation system. The actuation system shown in the example of FIG. 3 is a hydraulic system including a plurality of hydraulic struts 304, 306, 308 at a specific location along the body of the shape morphing fuselage 102, though other mechanical systems or shape-memory systems used for actuation purposes are also possible. Each of the hydraulic struts 304, 306, 308 in this example is coupled to one of the flexible frame members 110, 300, 302 such that translation of the hydraulic struts 304, 306, 308 will in turn cause translation in position for the flexible frame members 110, 300, 302 at the specific location along the shape morphing fuselage 102 where the hydraulic struts 304, 306, 308 are coupled to the flexible frame members 110, 300, 302. Section A-A is shown in a central position along the portion of the shape morphing fuselage 102 and is further described in respect to FIG. 4 below.

Figure 4:
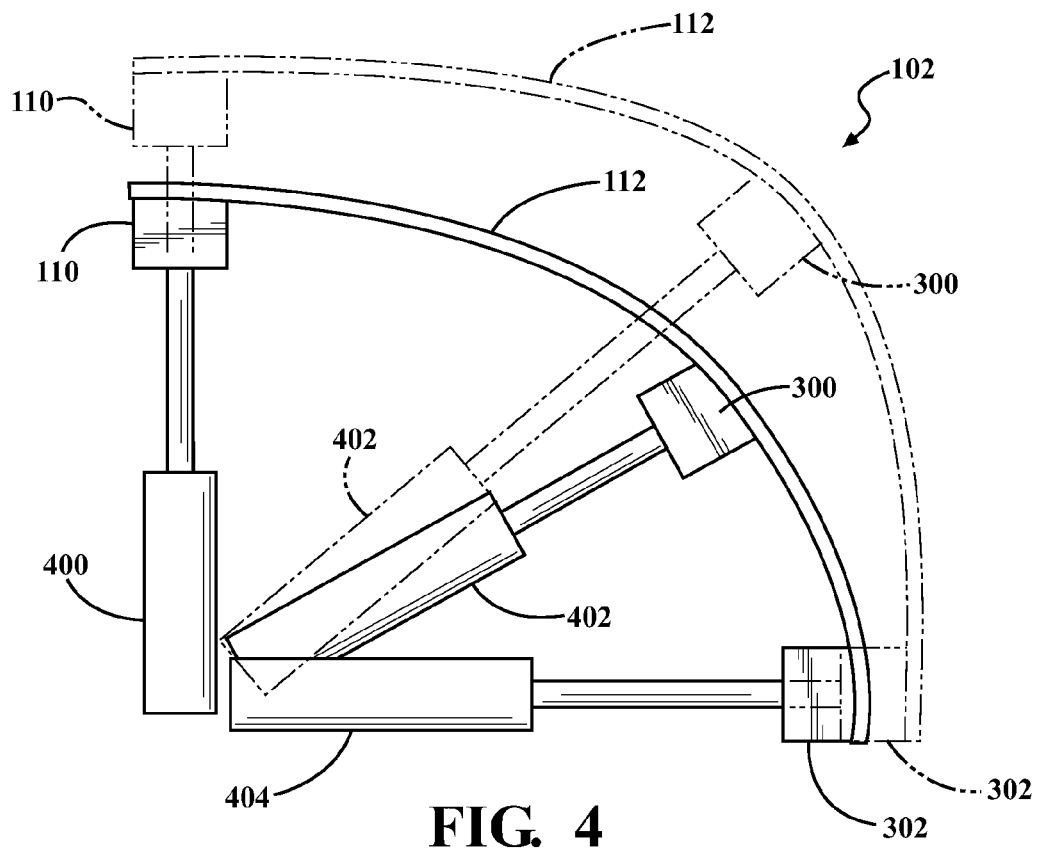
FIG. 4 is a sectional view of the portion of the shape morphing fuselage of FIG. 3 through section A-A showing the transition between the land mode and the flight mode.

FIG. 4 is a sectional view of the portion of the shape morphing fuselage 102 of FIG. 3 through section A-A showing the transition between the land mode and the flight mode. In this example, three additional hydraulic struts 400, 402, 404 are coupled to the flexible frame members 110, 300, 302 at the location of section A-A. In the expanded configuration associated with the land mode shown in dotted line, the hydraulic struts 400, 402, 404 are extended in position, forcing the tensile skin 112 to expand and maximize the size of the interior space, or cavity, of the shape morphing fuselage 102. When the actuation system is operated to retract the hydraulic struts 400, 402, 404, for example, after the wings 108 have been deployed and the hatch 116 closed, the flexible frame members 110, 300, 302 are translated inward, and the tensile skin 112 contracts to lessen the size of the cross-section of the shape morphing fuselage 102 at the location of the hydraulic struts 400, 402, 404. This contracted configuration associated with the flight mode is shown in solid line in FIG. 4.

Additionally, the hydraulic struts 400, 402, 404 can be designed to pivot at an anchor location as is shown for hydraulic strut 402. By designing the hydraulic struts 400, 402, 404 to pivot, the shape of the shape morphing fuselage 102 can be more easily controlled during bending. Though the examples of FIGS. 3 and 4 describe two sets of hydraulic struts 304, 306, 308, 400, 402, 404, any number of sets of hydraulic struts can be located along the body of the aerocar 100 within the shape morphing fuselage 102 to form the actuation system, including a single set of hydraulic struts positioned proximate to the ends of the flexible frame members (e.g. tip 114 of flexible frame member 110) in order to provide the bending necessary to reduce the cross-section of the shape morphing fuselage 102. Also, other types of actuation systems can be employed, such as mechanical systems or shape-memory systems, to translate the flexible frame members 110, 300, 302.

Figure 5A:
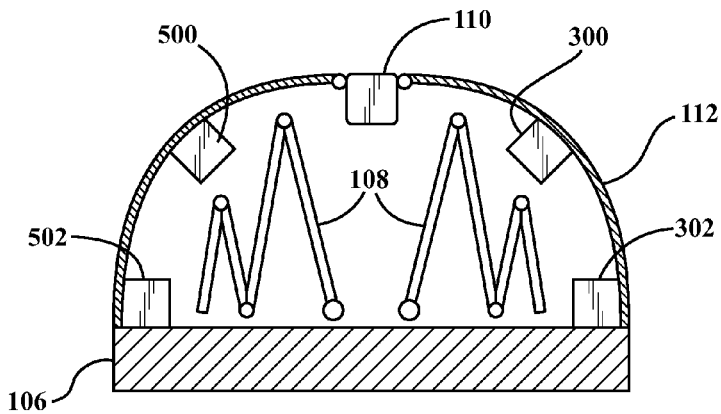
FIGS. 5A-5C are sectional views through the shape morphing fuselage of the aerocar of FIGS. 1 and 2 representing an exemplary process of wing deployment.
Figure 5B:
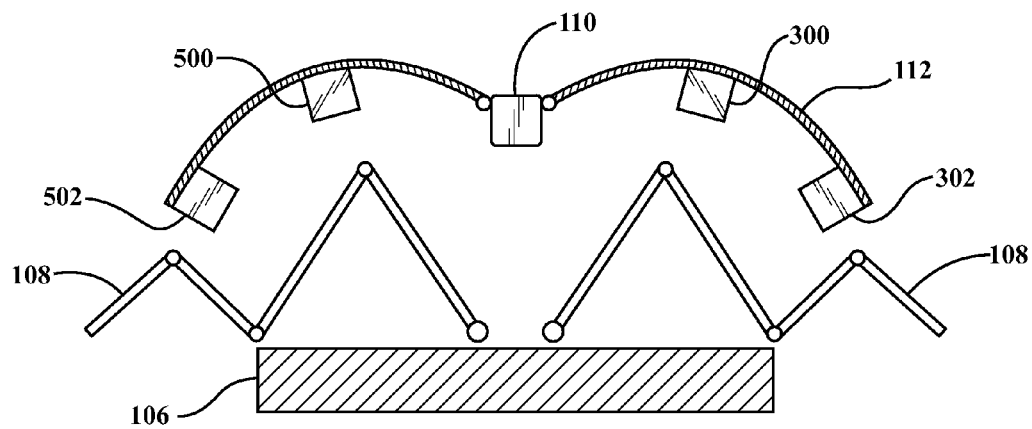
Figure 5C:
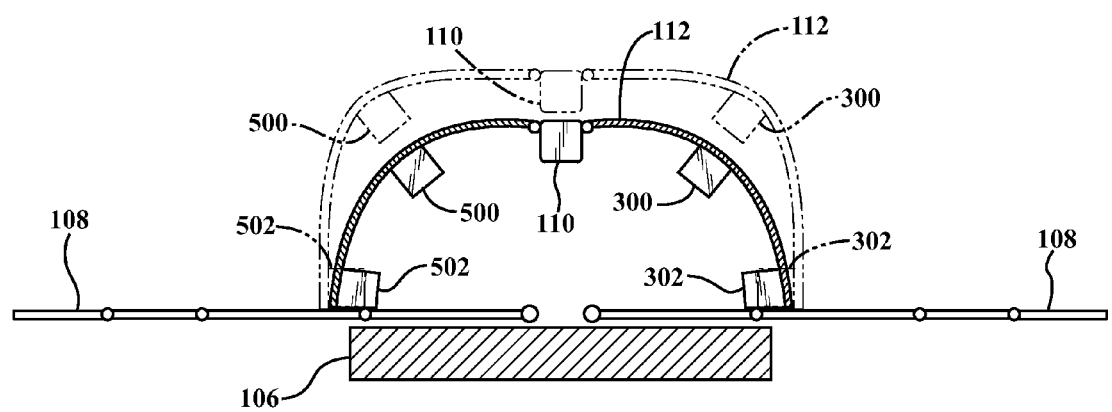

FIGS. 5A-5C are sectional views through the shape morphing fuselage 102 of the aerocar 100 of FIGS. 1 and 2 representing an exemplary process of wing 108 deployment. FIG. 5A shows a section of the shape morphing fuselage 102 in the land mode, indicating two additional flexible frame members 500, 502 added to the set of flexible frame members 110, 300, 302 already described above. The wings 108 of the aerocar 100 are folded within the interior space created by the flexible frame members 110, 300, 302, 500, 502 and the tensile skin 112 such that the aerocar 100 can operate in the land mode without risk of damage to the wings 108 and without additional drag caused by the wings 108. Though this example shows an accordion-style folding scheme for the wings 108, any folding style or other means of collapsing the wings 108 for storage within the shape morphing fuselage 102 is possible.

Moving from FIG. 5A to FIG. 5B, deployment of the wings 108 can be executed by first pivoting open the hatch 116 of the shape morphing fuselage 102 of the aerocar 100 about an axis of the flexible frame member 110 before deploying the wings 108 through the hatch 116 by, for example, unfolding the wings 108 and extending the wings 108 out the side of the aerocar 100. FIG. 5B shows the wings 108 in a partially deployed position and portions of the flexible frame members 300, 302, 500, 502 rotated about the longitudinal axis of the flexible frame member 110. In this example, the flexible frame members 300, 302, 500, 502 would be interrupted in design, the interruption allowing the hatch 116 shown in FIGS. 1 and 2 to open and close. Alternatively, fewer flexible frame members, or flexible frame members with a different spacing along the shape morphing fuselage 102 could be employed, allowing the hatch 116 to pivot about the flexible frame member 110 without impacting the remaining flexible frame members forming the shape morphing fuselage.

Moving from FIG. 5B to 5C, the wings 108 are fully deployed, and the hatch 116 can be pivoted closed before an actuation system can be used to bend the flexible frame members 110, 300, 302, 500, 502 from the expanded configuration associated with the land mode shown in dotted line to the contracted configuration associated with the flight mode shown in solid line. Though not shown in FIGS. 5A-5C for simplicity, the flexible frame members 110, 300, 302, 500, 502 can be bent, or translated, using, for example, the hydraulic struts 304, 306, 308, 400, 402, 404 described in reference to FIGS. 3 and 4. It is understood that any actuation system used would need to allow sufficient clearance for storage, deployment, and retraction of the wings 108 to transform the aerocar 100 from land mode to flight mode.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuselage for an aerocar, comprising:
   a plurality of flexible frame members extending along a length dimension of the fuselage;
   tensile skin extending between the plurality of flexible frame members; and
   a plurality of hydraulic struts coupled to respective flexible frame members and configured to translate in position to cause a translation in position of the plurality of flexible frame members, selectively bending the plurality of flexible frame members and modifying a cross-sectional area of the fuselage between a contracted configuration and an expanded configuration;
   wherein the contracted configuration is associated with a flight mode and the expanded configuration is associated with a land mode.

2. The fuselage of claim 1, wherein each of the plurality of flexible frame members defines a cross section tapering along its length dimension from a maximum at an end to a minimum at a tip.

3. The fuselage of claim 1, wherein the expanded configuration defines an interior space configured for storage of wings for the aerocar.

4. The fuselage of claim 1, further comprising:
   a hatch pivotable about an axis of one of the flexible frame members in the expanded configuration and configured to open for deployment and retraction of a wing of the aerocar.

5. The fuselage of claim 1, wherein the tensile skin includes at least one of a stretchable material or a shape-memory material.

6. The fuselage of claim 1, wherein at least one hydraulic strut is configured to pivot at an anchor location.

7. A fuselage for an aerocar, comprising:
   a plurality of flexible frame members extending along a length dimension of the fuselage;
   an actuation system configured to bend the plurality of flexible frame members between a contracted configuration associated with a flight mode and an expanded configuration associated with a land mode; and
   a pair of hatches pivotable about an axis of one of the flexible frame members in the expanded configuration and configured to open for deployment and retraction of a pair of respective wings for the aerocar,
   wherein the actuation system comprises a hydraulic strut coupled to each of the plurality of flexible frame members and configured to translate in position to cause a translation in position of the respective flexible frame members, selectively bending the plurality of flexible frame members and modifying a cross-sectional area of the fuselage between a contracted configuration and an expanded configuration.

8. The fuselage of claim 7, wherein each of the plurality of flexible frame members defines a cross section tapering from a maximum at an end to a minimum at a tip.

9. The fuselage of claim 7, further comprising:
   tensile skin extending between the plurality of flexible frame members.

10. The fuselage of claim 9, wherein the tensile skin includes at least one of a stretchable material or a shape-memory material.

11. The fuselage of claim 7, wherein the expanded configuration defines an interior space configured for storage of the wings for the aerocar.

12. The fuselage of claim 7, wherein at least one hydraulic strut is configured to pivot at an anchor location.

13. A method of transitioning a fuselage from a land mode to a flight mode, comprising:
   in the land mode, pivoting open a hatch in the fuselage about an axis of a flexible frame member extending along a length dimension of the fuselage;
   deploying a wing through the hatch;
   pivoting closed the hatch; and
   bending, using a hydraulic strut coupled to the flexible frame member, the flexible frame member from an expanded configuration associated with the land mode to a contracted configuration associated with the flight mode, thereby transitioning a cross-sectional area of the fuselage from an expanded configuration to a contracted configuration.

14. The method of claim 13, wherein the flexible frame member defines a cross section tapering from a maximum at an end to a minimum at a tip, and the step of bending the flexible frame member comprises bending an area of the flexible frame member adjacent the tip.

15. The method of claim 13, wherein the fuselage further includes a plurality of flexible frame members coupled to a plurality of respective hydraulic struts, and the method comprises bending each flexible frame member from an expanded configuration associated with the land mode to a contracted configuration associated with the flight mode.

16. The method of claim 13, wherein bending the flexible frame member comprises using a hydraulic strut pivotally coupled to the flexible frame member.

* * * * *